United States Patent
Georgis

Patent Number: 6,128,698
Date of Patent: *Oct. 3, 2000

[54] TAPE DRIVE EMULATOR FOR REMOVABLE DISK DRIVE

[75] Inventor: Steven P. Georgis, Boulder, Colo.

[73] Assignee: Exabyte Corporation, Boulder, Colo.

[*] Notice: This patent is subject to a terminal disclaimer.

[21] Appl. No.: 08/905,326

[22] Filed: Aug. 4, 1997

[51] Int. Cl.$^7$ ..................................................... G06F 12/00
[52] U.S. Cl. ........................... 711/111; 711/118; 395/500; 369/84; 369/59
[58] Field of Search ............................... 395/500; 369/84, 369/59; 711/118; 360/15, 61

[56] References Cited

U.S. PATENT DOCUMENTS

| | | |
|---|---|---|
| 3,955,180 | 5/1976 | Hirtle . |
| 4,467,421 | 8/1984 | White ...................................... 711/118 |
| 4,511,963 | 4/1985 | Kantner . |
| 4,727,512 | 2/1988 | Birkner et al. . |
| 4,730,321 | 3/1988 | Machado ................................. 371/37.5 |
| 4,775,969 | 10/1988 | Osterlund . |
| 4,947,367 | 8/1990 | Chang et al. . |
| 5,075,805 | 12/1991 | Peddle et al. ............................... 360/61 |
| 5,297,124 | 3/1994 | Plotkin et al. . |
| 5,301,304 | 4/1994 | Menon . |
| 5,438,674 | 8/1995 | Keele et al. . |
| 5,455,926 | 10/1995 | Keele et al. . |
| 5,642,497 | 6/1997 | Crary et al. . |
| 5,778,395 | 7/1998 | Whitining et al. ....................... 707/204 |
| 5,802,398 | 9/1998 | Liu et al. ................................. 395/882 |

*Primary Examiner*—John W. Cabeca
*Assistant Examiner*—Mehdi Namazi
*Attorney, Agent, or Firm*—Nixon & Vanderhye, P.C.

[57] ABSTRACT

A tape drive emulator (30) is between a host computer (40) and a removable disk drive (22) and appears to the host computer 40 as a sequential storage system, e.g., a tape drive. However, the tape drive emulator (30) processes the data obtained from or applied to host computer 40 so that the data can be communicated to removable disk drive 22 in a manner compatible with a conventional removable disk drive. Yet in so doing, tape drive emulator 30 imposes on the data (1) an data organization, imperceptible to disk drive 22, for rendering the data expressable and locatable in a tape drive format, and (2) an additional degree of error correction that provides enhanced data integrity necessary for data backup/restore operations.

36 Claims, 15 Drawing Sheets

TAPE DRIVE EMULATOR FOR REMOVABLE DISK DRIVE

BACKGROUND

1. Field of the Invention

This invention pertains to the storage or backup of data on magnetic media, and particularly the utilization of a removable disk drive.

2. Related Art and Other Considerations

Data, such as computer-generated data, is typically stored on a backup media for e.g., security and archival purposes. In view of reliability and affordability, magnetic tape has traditionally been a preferred media for data backup and restoration. Numerous types of magnetic tape drives are currently marketed, including helical scan tape drives and serpentine-type tape drives.

Another type of magnetic media is the magnetic disk. Magnetic disks are traditionally classified as either floppy disks or hard disks. Both floppy and hard disks are handled by respective types of disk drives. Of the two types, the hard disk is normally employed for on-line data storage and has a significantly greater storage capacity. Moreover, in contrast to floppy disks, historically hard disks have been essentially permanently housed in the drive and removable or manipulated only by a technician.

In recent years removable disk drives have become available. A removable disk drive is a variation of the hard disk drive which allows a disk cartridge to be removed from the drive. Like the conventional hard disk, the disk of the removable disk drive is preformatted, as explained below.

Disk drives employ a format which divides the data into fixed-sized sectors. Typically a sector has either 512 or 1024 bytes of user data. Each sector is a self-contained unit that includes, along with the user data, certain control information such as synchronization marks, headers, cyclical redundancy check (CRC) characters, and error correction characters (ECC). Consequentially, the error correction characters (ECC) information contained on a disk is useful only for correcting errors within the sector in which it is stored. Such disk ECC information covers only the user data and the header of the sector. Other control information in the sector is not protected. If errors occur at locations which corrupt the control information, it is possible that the entire sector may not be readable. In other words, the disk ECC is to no avail for correcting information such as control information on disk.

In a normal hard disk drive the magnetic disk is sealed. Because of the particular manufacturing process for hard disks, defects on the disk which might cause errors are typically not a significant problem. In particular, in the manufacturing process for a hard disk, the disk manufacturer checks each sector and determines which sectors may be defective. If a sector is deemed defective, the sector is noted on a defect list for the disk. Sectors on the defect list are not available for recording data, i.e., remain unused. Then, after the disk is sealed in the disk drive, new defects on the disk are not introduced. The disk drive ECC thus can be minimal, and is designed only to correct small intermittent errors which can occur due to electromagnetic interference, radio frequency interference, environmental drift, and the like.

As mentioned above, in a removable disk drive the media is not sealed. Rather, the media is enclosed in a cartridge of some type, but the cartridge must be opened by the drive in order for heads of the drive to access the media. The process of opening and closing the disk cartridge can allow contaminates to enter the media and create new defects. In this case, the conventional drive ECC is insufficient to guarantee reliability of the data recorded on the removable disk.

Removable disk drives have numerous features appropriate for operations such as data backup and restore. Such features include long life, relative immunity to environmental limitations, high data rates, random access to data, and simple drive mechanisms. In addition, removable disk drives may ultimately be economically reasonable alternatives to other magnetic media. However, unless overcome, the inability to provide sufficient data integrity would jeopardize the usefulness of removable tape drives from integrity premium operations such as data back up and restore.

What is needed, therefore, and an object of the present invention, is method and apparatus for enhancing data integrity for removable disk drives.

SUMMARY

A tape drive emulator is between a host computer and a removable disk drive and appears to the host computer as a sequential storage system, e.g., a tape drive. However, the tape drive emulator processes the data obtained from or applied to the host computer so that the data can be communicated to the removable disk drive in a manner compatible with a conventional removable disk drive. Yet in so doing, the tape drive emulator imposes on the data (1) a data organization, imperceptible to the disk drive, for rendering the data expressable and locatable in a tape drive format, and (2) an additional degree of error correction that provides enhanced data integrity necessary for data backup/restore operations.

In a recording operation, the tape drive emulator, in response to tape drive-based commands from the host computer, packs compressed logical blocks of data into a buffer block, and uses the buffer block along with frame error correction bytes (generated over the entire buffer block) to produce a frame. In addition, the frame has header bytes and CRC bytes. The frame is recorded in plural sectors on the disk by the disk drive.

The frame error correction bytes facilitate recovery if one or two sectors of the disk are not readable by the disk drive. For example, if one or two sectors comprising a frame are unreadable from the disk, the frame error correction bytes enable the tape drive emulator to recover the lost sector(s), thereby providing a higher degree of data quality integrity.

A frame can be one of several frame types, including either a data frame or a directory frame. Directory frames are employed to compose a directory on the disk, e.g., at the beginning of the disk. The directory includes a frame index entry for each data frame recorded on the disk. The frame index entries enable the tape drive emulator to locate certain tape drive-related delimiters on the disk, such as logical block number, file marks, and set marks.

BRIEF DESCRIPTION OF THE DRAWINGS

FIG. 12 is a diagrammatic view showing a relationship between FIG. 12A and FIG. 12B.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
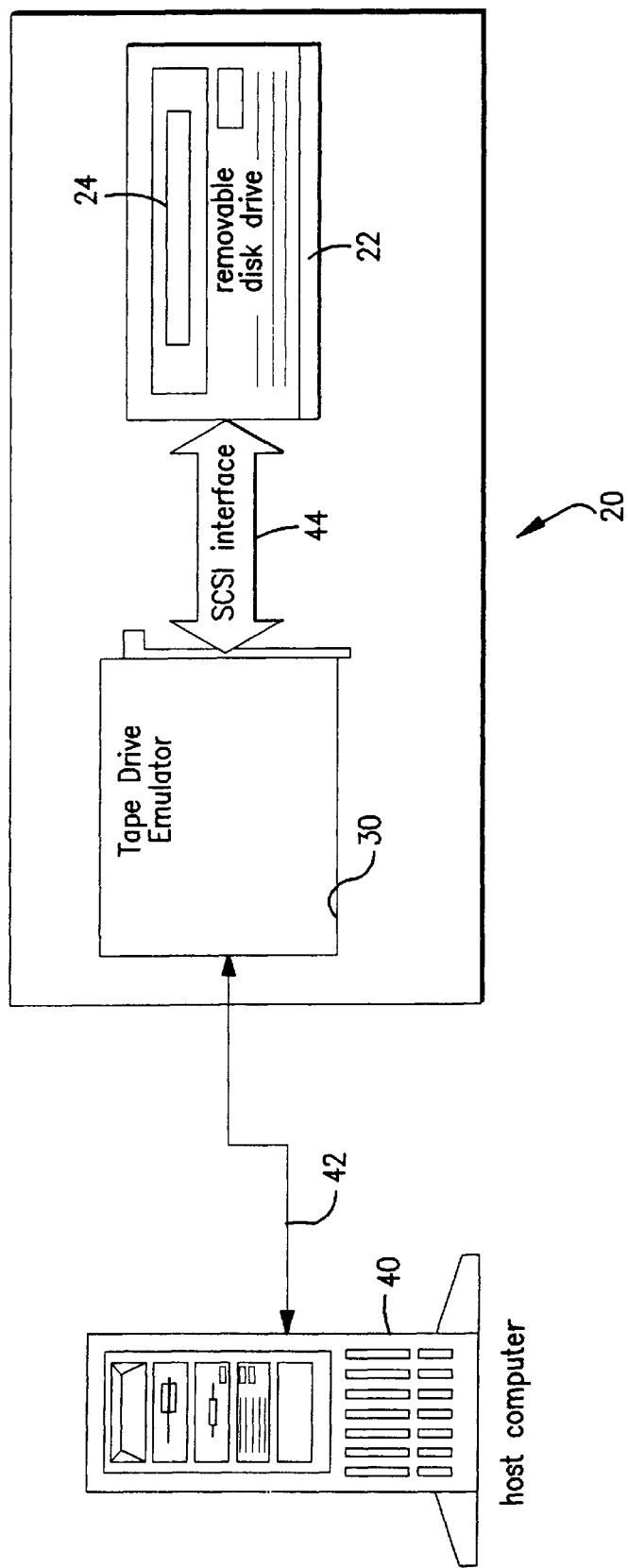
FIG. 1 is a schematic view of a data storage system according to an embodiment of the present invention.

FIG. 1 shows a data storage system 20 according to an embodiment of the invention. Data storage system 20 includes a removable disk drive 22 which handles a rotating magnetic disk 24, as well as tape drive emulator 30. In handling disk 24, disk drive 22 employs transducing elements or heads and suitable electronics in order to transduce (i.e., record or playback) information in sector format on disk 24. The information recorded on disk 24 during recording or writing is ultimately obtained from host computer 40 in connection with, for example, a backup operation for storing computer data from host computer 40 on disk 24. Conversely, information obtained from disk 24 during playback or reading is ultimately applied to host computer 40 as can occur in a data restore operation, for example.

In accordance with the present invention, tape drive emulator 30 is connected to host computer 40 and appears to host computer 40 as a sequential storage system, e.g., a tape drive. In this regard, cable 42 connecting host computer 40 with tape drive emulator 30 carries data and signals including commands for a tape drive. However, tape drive emulator 30 processes the data obtained from or applied to host computer 40 so that the data can be communicated to removable disk drive 22 over cable 44 in a manner compatible with a conventional removable disk drive. Yet in so doing, tape drive emulator 30 imposes on the data (1) a data organization, imperceptible to disk drive 22, for rendering the data expressable and locatable in a tape drive format, and (2) an additional degree of error correction that provides enhanced data integrity necessary for data backup/restore operations.

Figure 2:
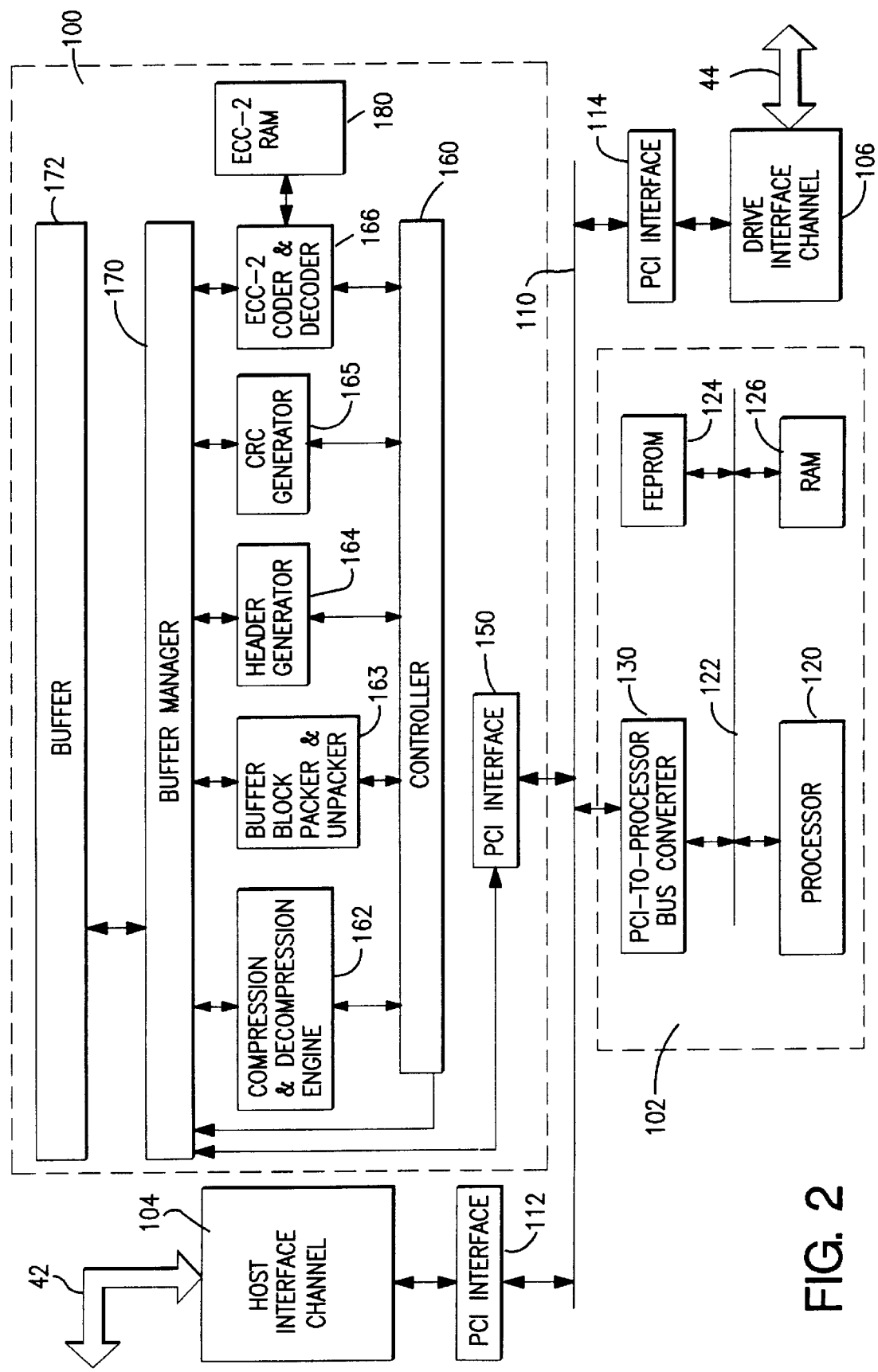
FIG. 2 is a schematic view of a tape drive emulator included in the data storage system of FIG. 1.

FIG. 2 shows tape drive emulator 30 as comprising data formatter/deformatter 100 and a processor section 102. In addition, tape drive emulator 30 has a host interface channel 104 and drive interface channel 106. Formatter/deformatter 100, processor section 102, host interface channel 104, and drive interface channel 106 communicate over a PCI bus 110. PCI interfaces 112 and 114 are provided for connecting respective host interface channel 104 and drive interface channel 106 to PCI bus 110.

Host interface channel 104 and drive interface channel 106 are constituted by suitable circuitry for processing signals and passing through data received from or applied to host computer 40 and disk drive 22, respectively. Drive interface channel 106 is preferably a SCSI port which connects by cable 44 to disk drive 22. Similarly, host interface channel 104 is also preferably a SCSI port, but depending on the nature of cable 42 can also be an optical fiber-handling or other type channel, including an RF or IF channel.

Processor section 102 includes a microprocessor 120 which communicates over processor bus 122 to various memory elements including FEPROM 124 and RAM 126. Processor bus 122 is also connected to a PCI-to-processor bus converter 130 which serves to interface and processor bus 122 with PCI bus 110.

Formatter/deformatter 100 connects to PCI bus 110 through PCI interface 150. Formatter/deformatter 100 comprises a controller 160 which supervises, coordinates, and sequences operation of various engines or units, including compression and decompression engine 162, buffer block packer and unpacker 163; header generator 164; CRC generator 165; and ECC encoder and decoder 166. ECC encoder and decoder 166 handles frame ECC bytes [depicted in the drawings as ECC-2], a layer of error correction which is above and beyond conventional disk drive ECC. In addition to the foregoing, formatter/deformatter 100 includes a buffer manager 170 which is utilized by controller 160 and these engines and units for storing and retrieving data with respect to buffer 172. Buffer 172 is a suitable memory chip, such as a RAM, in which data is stored in accordance with an organization formulated by buffer manager 170 in the manner hereinafter described e.g., with reference to FIG. 6. Another memory, particularly ECC RAM 180, is also provided in formatter/deformatter 100, but is accessible by ECC encoder and decoder 166 for purposes of e.g., intermediate storage error correction bytes, syndromes and the like generated by ECC encoder and decoder 166.

Figure 3:
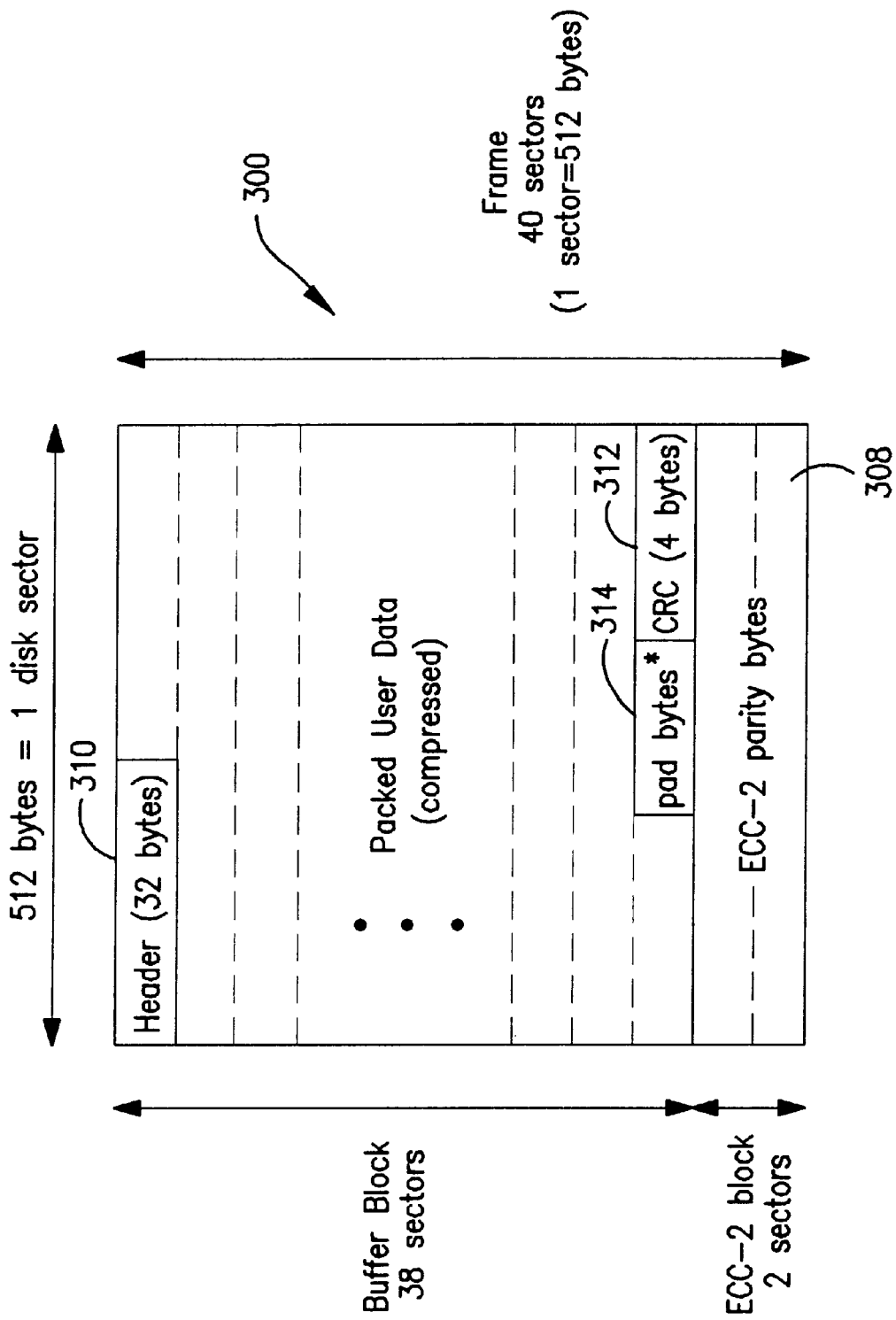
FIG. 3 is a diagrammatic view of a frame utilized in the data storage system of FIG. 1.

Assuming that disk 24 is formatted to have sectors of 512 bytes each, FIG. 3 shows a transparent organization imposed by formatter/deformatter 100 of tape drive emulator 30 on the data stored on disk 24. In particular, the data stored on disk 24 is organized frames, one such frame 300 being shown in FIG. 3. Each frame 300 is to be laid down on disk 24 in a data area of forty conventional disk sectors, the sectors being delineated for sake of illustration as horizontal lines (either solid or broken) in FIG. 3. The portion of frame 300 included in the data area of the first thirty eight sectors are referenced herein as a "buffer block", while the data area of the last two sectors occupied by each frame 300 include the frame ECC bytes 308, or the enhanced or second tier ECC bytes. The first thirty two bytes of the data area of the first sector of frame 300 serve as a frame header 310. The last four bytes of the data area of the thirty eighth sector serve as buffer block CRC bytes 312. Compressed and packed user data lies between frame header 310 and buffer block CRC bytes 312. Pad bytes (indicated by reference numeral 314) are employed as necessary to fill in the user data area between frame header 310 and buffer block CRC bytes 312.

In accordance with the present invention, frames such as frame 300 can serve various purposes. Perhaps the most common employment of the frames is for actual user data. However, another type of frame is the directory frame. Directory frames contain index information as described in more detail in connection with FIG. 13, FIG. 14, and FIG. 15.

While FIG. 3 shows a particular organization in which forty sectors comprise frame 300, it should be understood that frame size can vary in other embodiments. Any embodiments having variants in frame size should assure sufficient frame error correction in accordance with the frame size.

Figure 4:
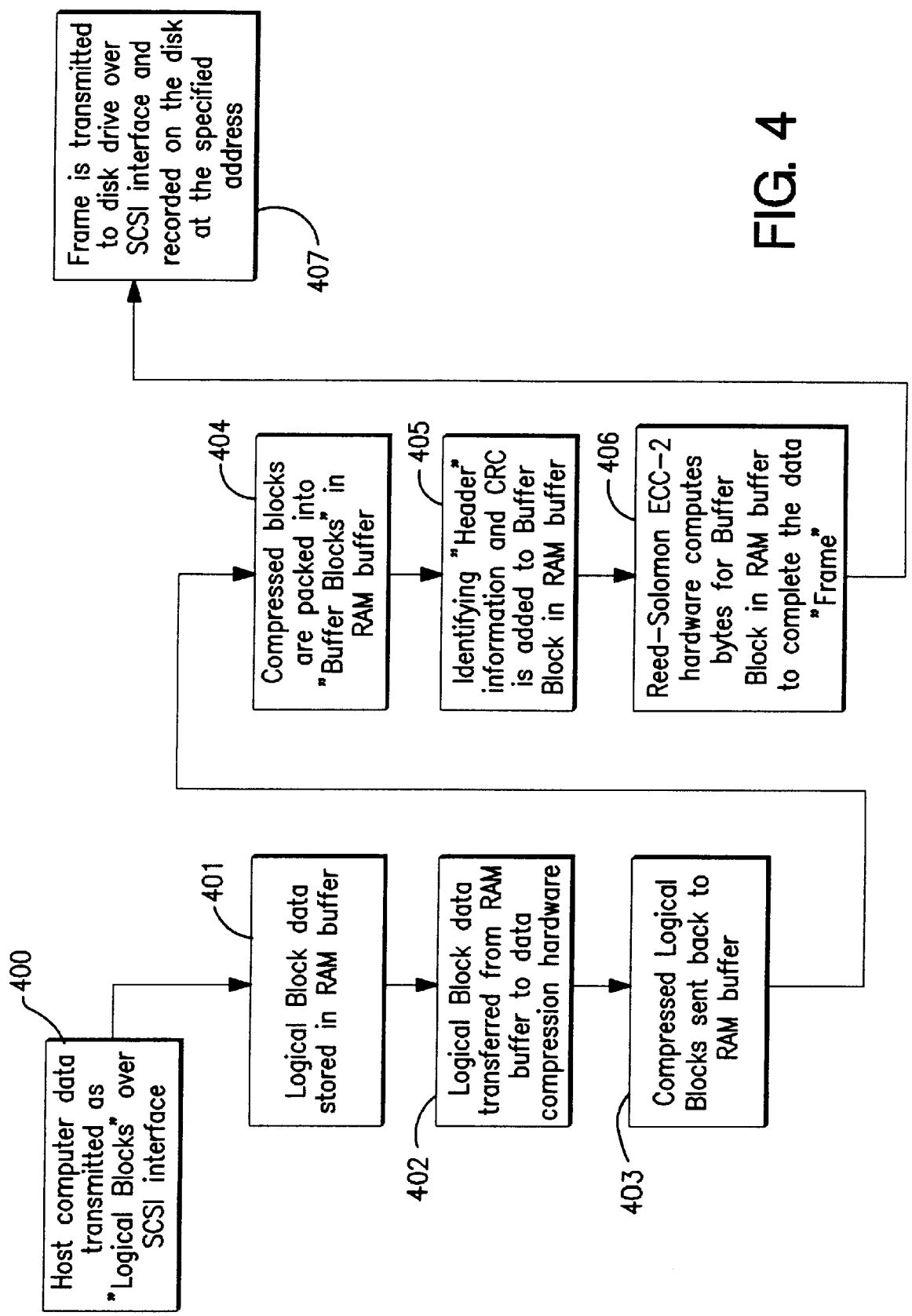
FIG. 4 is a flowchart generally showing steps involved in a recording process using the data storage system of FIG. 1.

FIG. 4 shows basic steps depicted in a recording or write process in which user data from host computer 40 is recorded on disk 24. As indicated by step 400, host computer 40 transmits logical blocks of user data over cable 42 for reception at host interface channel 104 (see FIG. 2). At an appropriate time, the logical blocks are transmitted over PCI bus 110 to formatter/deformatter 100 and are stored, under control of buffer manager 170, in appropriate memory locations in buffer 172 (step 401).

Figure 6:
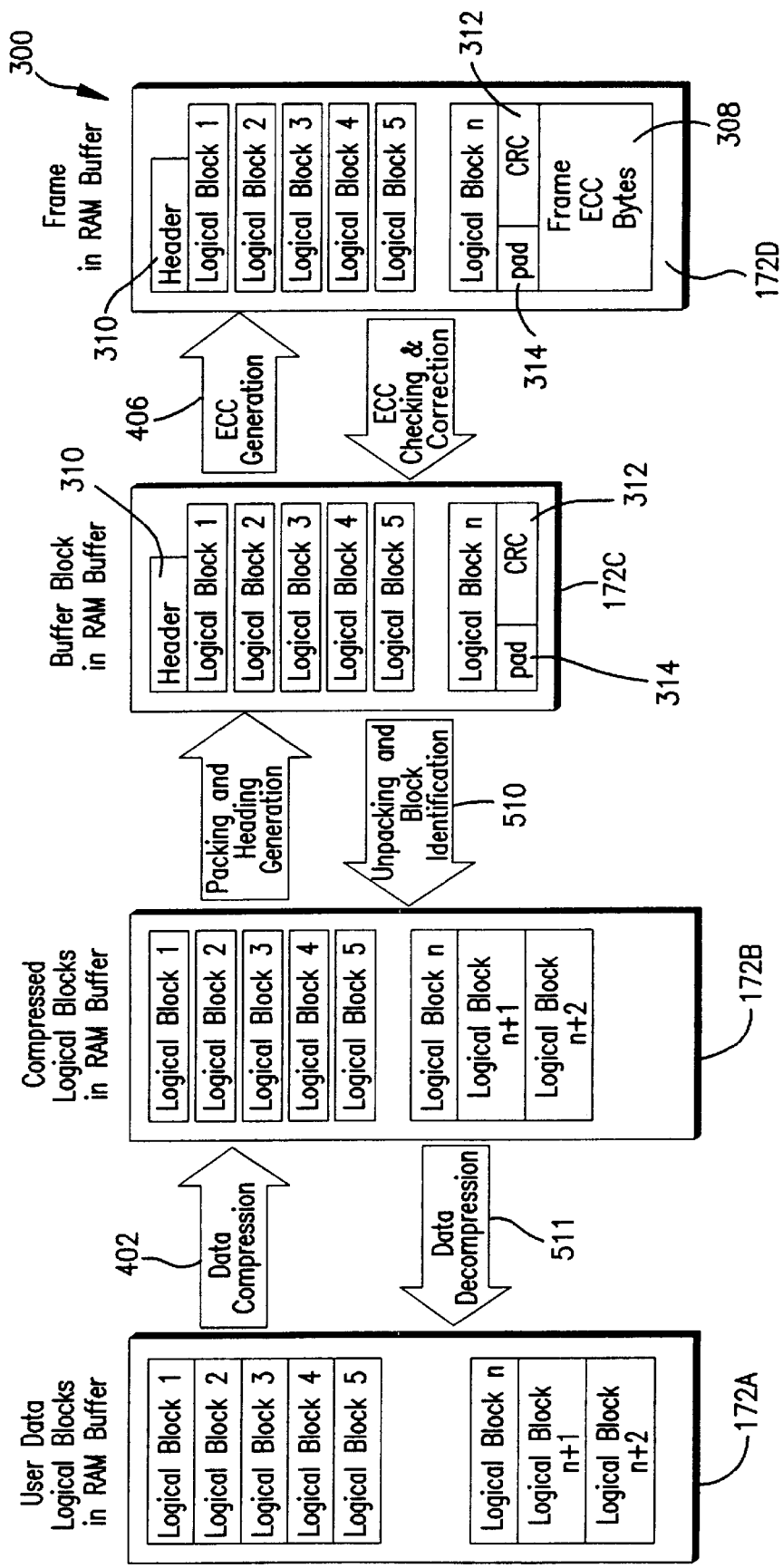
FIG. 6 is a diagrammatic view showing a flow of data from logical blocks to frames in the data storage system of FIG. 1.

Step 402 shows the logical blocks stored in buffer 172 being transferred, via buffer manager 170, to compression and decompression engine 162. Engine 162 compresses the logical block using any one of several conventional data compression techniques, and then (via buffer manager 170) returns the logical blocks to buffer 172 as indicated by step 403. FIG. 6 shows an illustrative section 172A of buffer 172 in which logical blocks obtained from host computer 40 are stored in accordance with step 401. Section 172B of buffer 172 as depicted in FIG. 6 shows compression of logical blocks after the compression of step 402.

At step 404, a set of compressed logical blocks are packed into a buffer block. As mentioned before, in the illustrated embodiment a buffer block will be laid down in the data area of the first thirty eight sectors of a forty sector frame 300 (see FIG. 3). For the packing operation, a memory location such as section 172B is transmitted via buffer manager 170 to buffer block packer and unpacker 163 (see FIG. 2) for generation of a buffer block. After packing, the packed buffer block is returned to buffer 172.

Step 405 involves generation of both frame header 310 and buffer block CRC bytes 312 (see FIG. 3) for the buffer block. Frame header 310 and buffer block CRC bytes 312 are generated by header generator 164 and CRC generator 165, respectively, under supervision of controller 160 in a manner understood by those skilled in the art. Fame header 310 includes control and identification information which conveys frame sequence number, frame type, control flags related to the packing of logical blocks in the frame, logical block count, file mark count, setmark count, and partition number.

FIG. 6 shows as section 172C the contents of a buffer block upon insertion therein of frame header 310 and buffer block CRC bytes 312 upon completion of steps 405, as well as insertion of pad bytes 314. Pad bytes 314 can be generated by a separate unillustrated pad byte generator, or alternatively by other elements such as controller 160.

Step 406 shows that the buffer block is transmitted to ECC encoder and decoder 166 whereat the buffer block is utilized to generate frame ECC bytes over the entire buffer block. As shown in FIG. 3, upon return of the buffer block and frame ECC bytes to buffer 172, a frame 300 is formed as shown in section 172D of FIG. 6. As mentioned previously, in the illustrated embodiment the frame ECC bytes 308 ultimately comprise two sectors of frame 300.

Step 407 shows the frame being transmitted from buffer 172 to removable disk drive 22, as well as recording by disk drive 22 in accordance with its conventional operation on disk 24. The transmission involves retrieval of the frame from buffer 172 by buffer manager 170 and application of the frame to PCI bus 110 (via PCI interface 150) and then to drive interface 106 and cable 44.

Figure 7:
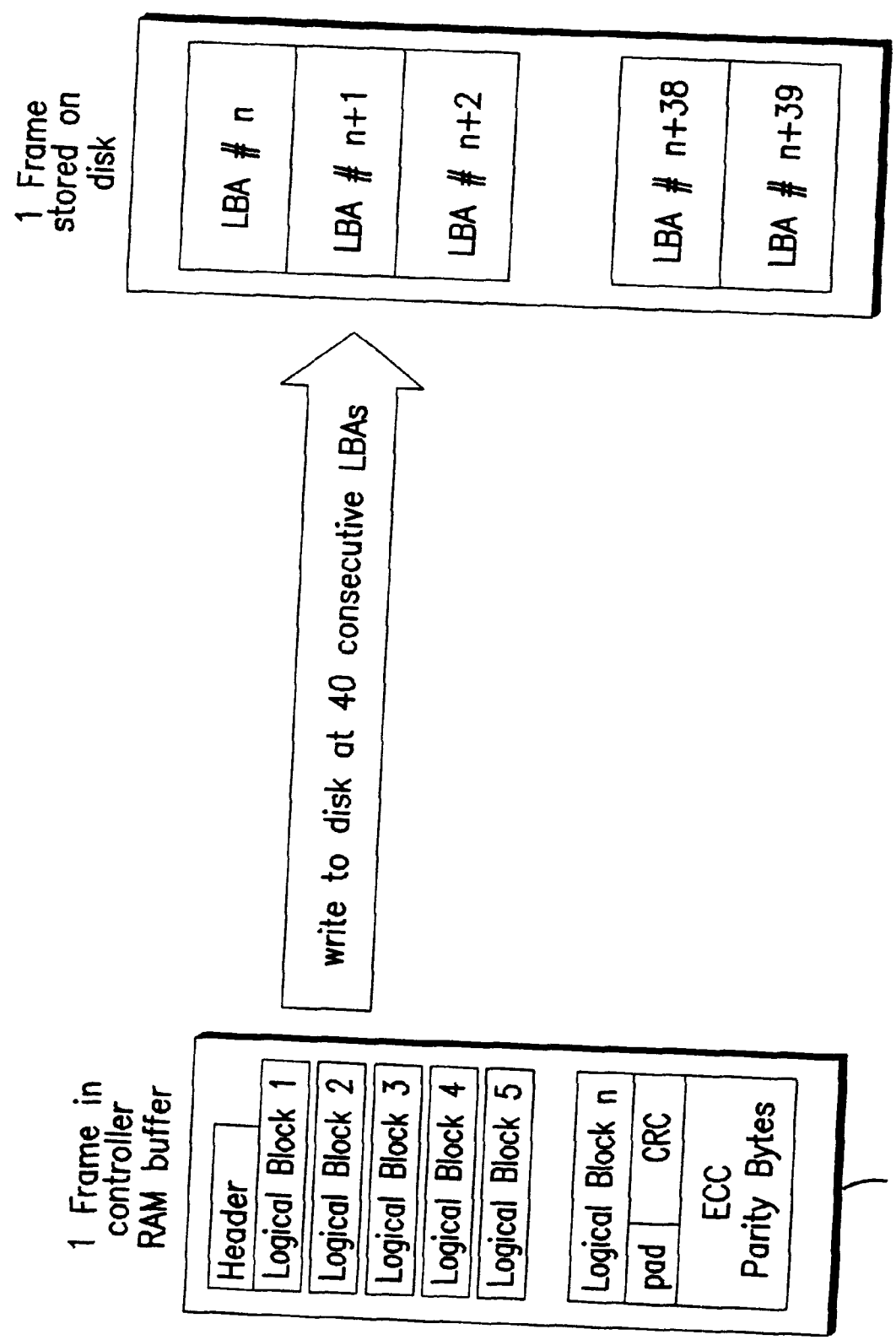
FIG. 7 is a diagrammatic view showing a mapping of frames to disk sectors in the data storage system of FIG. 1.

FIG. 3 shows how frame 300 corresponds to sectors of the disk 24, it being remembered that a frame utilizes the data areas of forty sectors of disk 24. In addition, FIG. 7 shows the recording of frame 300 on disk 24, the sectors of disk 24 each having a corresponding logical block address number (e.g., LBA #n, LBA #n+1, etc.). In this regard, disk sectors are addressed as "LBAs". The LBAs of disk 24 are numbered consecutively from zero up to the maximum the disk can store. All LBAs represent defect-free physical sectors on disk 24, and hence do not necessarily represent contiguous physical locations on disk 24.

Figure 8:
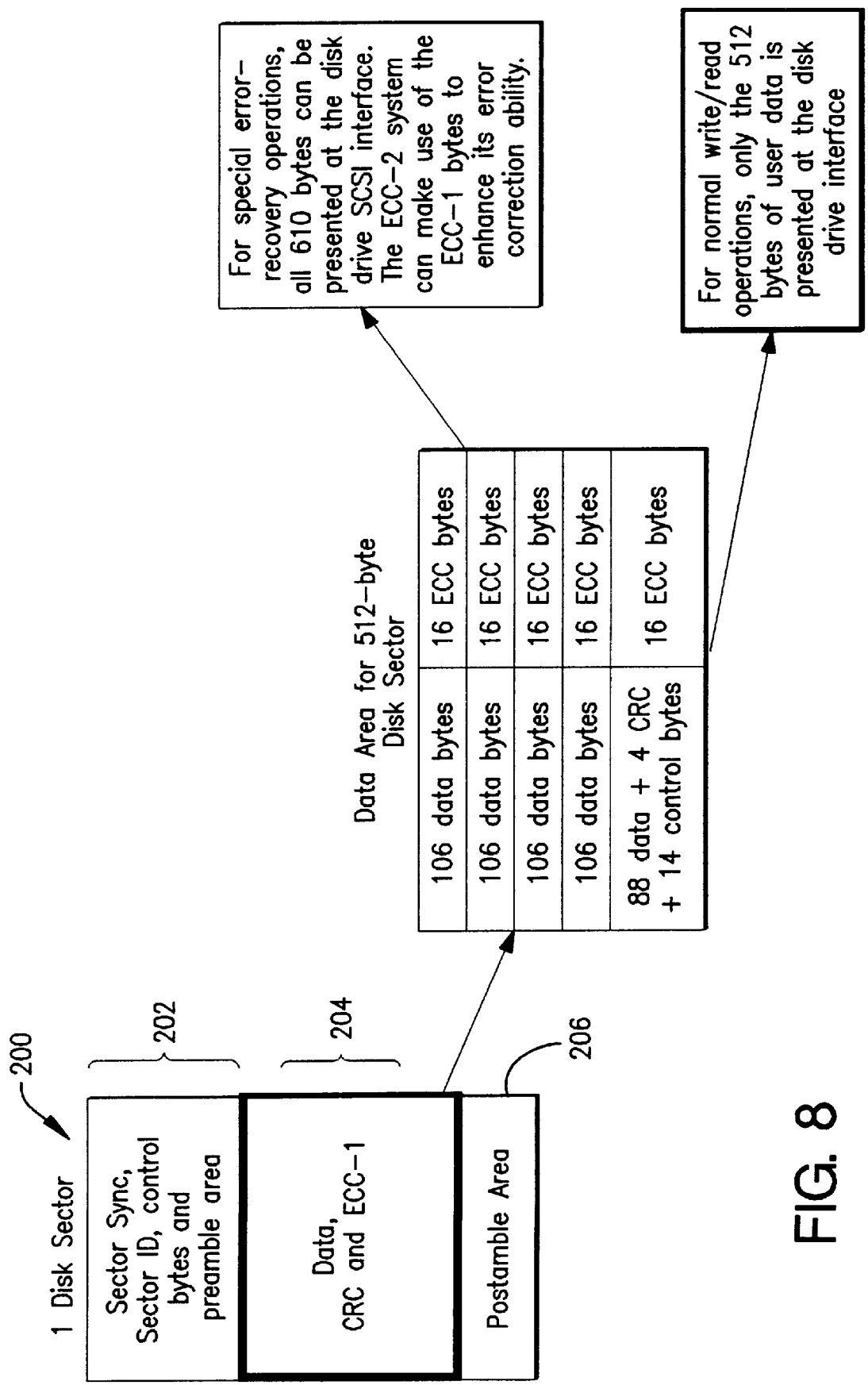
FIG. 8 is a diagrammatic view showing embedded disk sector format and error correction information.

When disk drive 22 records a sector on disk 24, the sector is formatted as shown by sector 200 FIG. 8. Each sector includes preamble area 202; a sector data area 204; and sector postamble area 206. Sector preamble area 202 includes sector identification information such as a sector synchronization field, a sector identification number, and various control bytes. Sector data area 204 includes the 512 user data bytes (which gives sector 200 the denomination as a "512 byte" sector), as well as disk drive-generated sector error correction bytes. As shown in FIG. 8, in sector data area 204 sixteen sector ECC bytes (shown in the drawings as ECC-1) are generated over each of four groupings of one hundred six data bytes. In addition, sixteen sector ECC bytes are generated over a set of bytes comprising the last eighty eight data bytes of the sector, four disk drive-generated CRC bytes of the sector, and disk drive-generated fourteen control bytes of the sector.

All information in sector 200 of FIG. 8 except the 512 data bytes are generated by the disk drive 22 for inclusion in sector 200. The 512 data bytes, on the other hand, are obtained from a portion of a frame 300 generated by tape drive emulator 30 (e.g., a portion of frame 300 corresponding to one horizontal row of FIG. 3).

As explained above, the disk drive-generated sector ECC bytes cover essentially only the 512 data bytes of sector 200 shown in FIG. 8. Importantly, the disk drive-generated sector ECC bytes do not cover the information included in sector preamble area 202. Therefore, if sector 200 is not deemed a defective sector at manufacturing, but sector 200 later becomes contaminated e.g., by manipulation of removable disk 24, an error in sector preamble area 202 cannot be corrected by the error correction techniques employed by disk drive 22. For example, an error occurring in sector preamble area 202 could render the entire sector 200 irretrievable and/or unreadable.

The present invention overcomes the problem of an error in portions of sector 200 such as sector preamble area 202. In fact, in accordance with the present invention, inability of disk drive 22 to obtain or read an entire sector 200 from disk 24 is essentially immaterial to operation of data storage system 20. In this regard, and as explained in more detail below, the provision of frame error correction bytes 308 enable tape drive emulator 30 to generate as many as two sectors of a frame which otherwise would be unreadable by disk drive 22.

Figure 5:
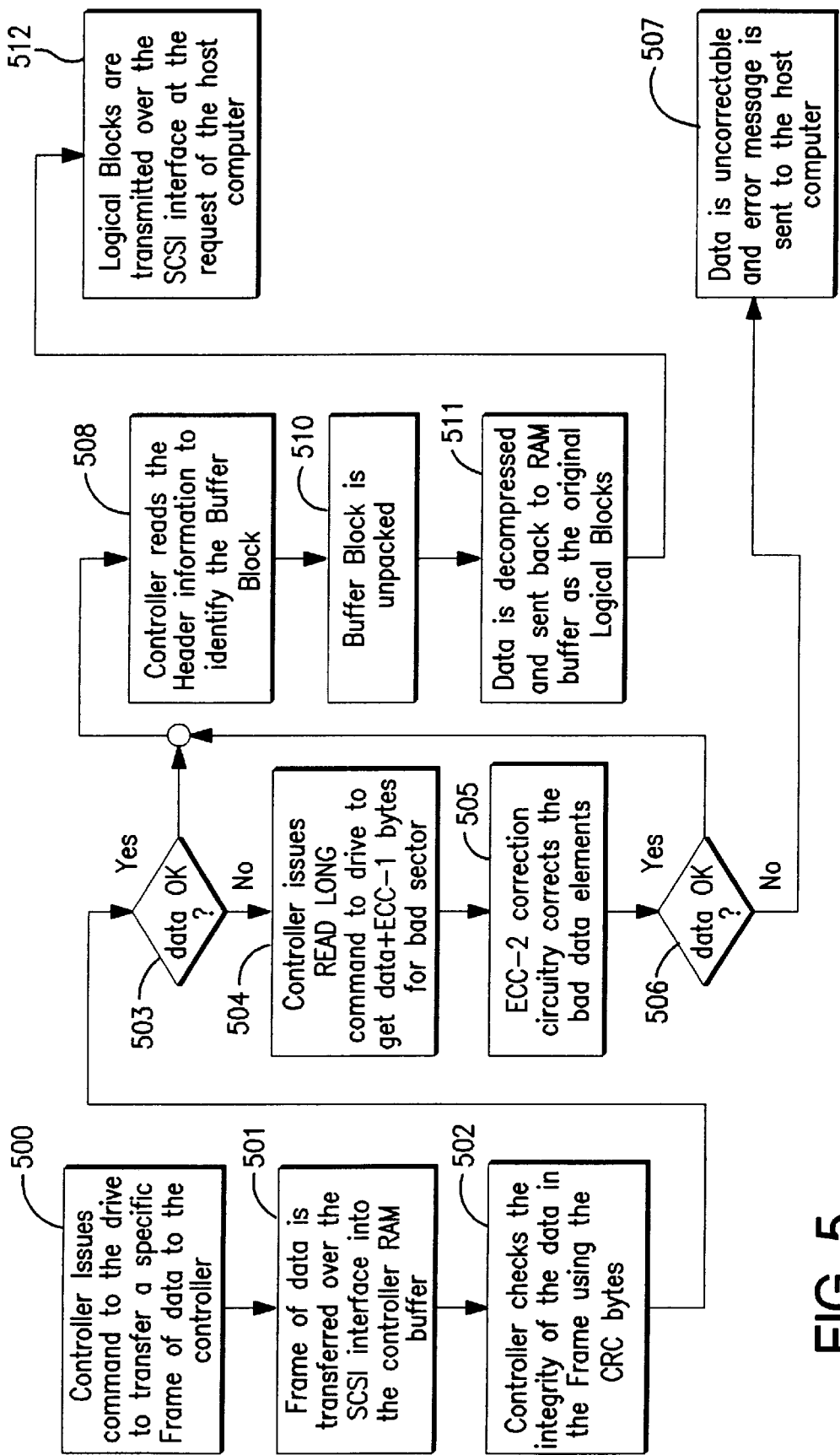
FIG. 5 is a flowchart generally showing steps involved in a playback process using the data storage system of FIG. 1.

FIG. 5 shows basic steps involved in playing back, e.g., reading, information recorded on removable disk 24. At step 500, tape drive emulator 30 issues to tape drive 22 a read command to transfer data to tape drive emulator 30. The read command issued from tape drive emulator 30 to transfer data is in response to a similar command issued to tape drive emulator 30 from host computer 40. Since host computer 40 thinks that it is connected to a tape drive, its command to tape drive emulator 30 will prompt tape drive emulator 30 to request a frame of data from disk drive 22. In response to the read command issued by tape drive emulator 30, disk drive 22 obtains forty sectors from disk 24. As indicated by step 501, the sector data areas of these forty sectors (which constitutes a frame) are transferred over cable 40 to tape drive emulator 30. In tape drive emulator 30, the sectors are transmitted through drive interface channel 106 to PCI bus 110 (via PCI interface 114) and (via PCI interface 150 and buffer manager 170) into an appropriate location (e.g., next available location) in buffer 172. Section 172D of FIG. 6 shows the contents of a frame upon receipt from disk drive 22.

At step 502 the frame just obtained from disk drive 24 is transferred (via buffer manager 170) to ECC encoder and decoder 166 for an integrity check. ECC encoder and decoder 166 which performs an error location operation to determine at step 503 whether any errors reside in the frame (e.g., if syndromes generated by ECC encoder and decoder 166 indicate any errors) and the location of such errors (e.g., by generation of an error locator polynomial). If any errors are detected in the frame, steps 504–506 are executed before resuming execution at step 508.

In the event that ECC encoder and decoder 166 detects an error in the frame, the sector ECC information generated by disk drive 22 would be useful in correcting the errors. In this regard, at step 504 tape drive emulator 30 issues to disk drive 22 a special command to obtain, for the erroneous sector(s) of the frame just read, not only the 512 data bytes, but also the eighty sector ECC bytes which cover sector data area 204 (see FIG. 8). The special type of command which obtains the sector ECC bytes in addition to user data bytes is commonly called a READ LONG command. Such a READ LONG command enables recovery of all six hundred ten bytes of sector data area 204 at the disk drive SCSI interface.

At step 505, ECC encoder and decoder 166 uses both the sector ECC bytes and the frame ECC bytes 308 (see FIG. 3) in order to generate correction bytes which are substituted into the erroneous bytes indicated by the error locator polynomial. Error correction performed by ECC encoder and decoder 166 is hereinafter described in more detail with reference to FIG. 9 and FIG. 10. If it turns out that the frame is uncorrectable, an error message is sent to host computer 40 as indicated by step 507. Otherwise, the corrected frame is returned (via buffer manager 170) to buffer 172 and execution continues with step 508.

Step 508 involves controller 160 reading header bytes 310 of the frame (see FIG. 3) in order to obtain identification information from the frame. After the frame is properly identified, at step 510 the buffer block (e.g., corresponding to the first thirty eight sectors of the frame) is unpacked. In particular, at step 510 the buffer block is sent via buffer manager 170 to buffer block packer & unpacker 163 where the buffer block is unpacked and returned to buffer 172. The unpacking of the buffer block is represented by the transition from section 172C to 172B in FIG. 6.

After being unpacked, the unpacked but still-compressed logical blocks obtained from the buffer block are next sent from buffer 172 to compression and decompression engine 162 where (at step 511) the logical blocks are decompressed. The decompressed data is then loaded into an appropriate location in buffer 172, with the decompressed data now being allocated in logical blocks as shown by section 172A in FIG. 6.

Step 512 shows the logical blocks being transmitted from tape drive emulator 30 to host computer 40. In the transmission, the logical blocks are obtained by buffer manager 170 from buffer 172, and applied via PCI interface 150 to PCI bus 110 to host interface channel 104 (via PCI interface 112). From host interface channel 104 the logical blocks are applied on cable 42 to host computer 40 in conventional manner.

Figure 9:
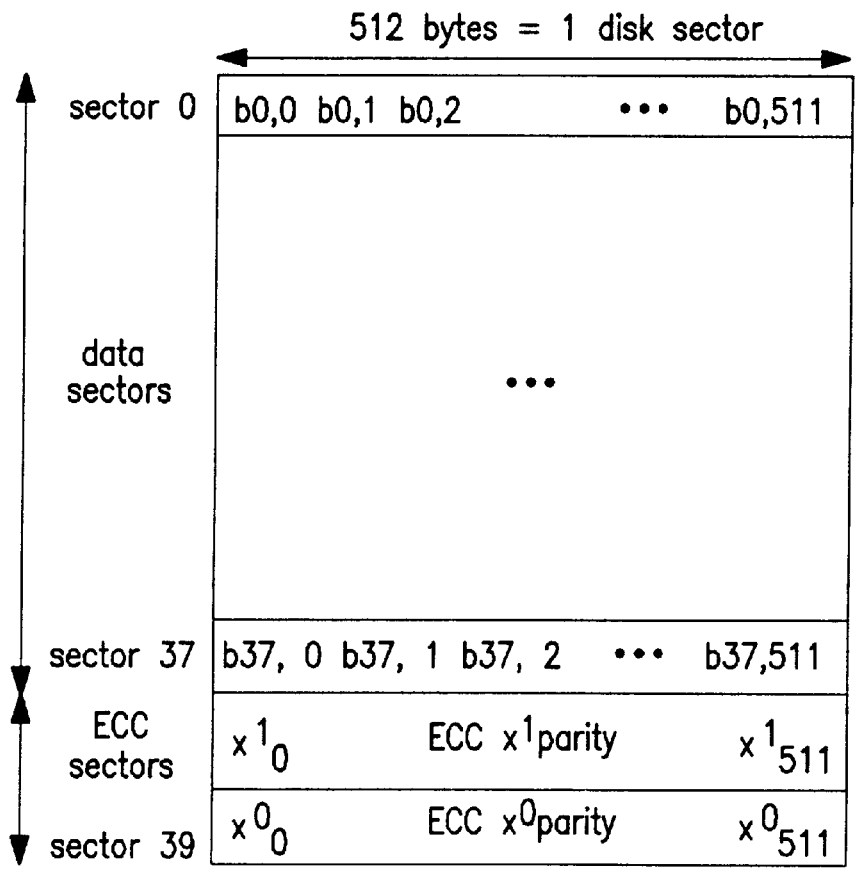
FIG. 9 is a diagrammatic view showing implementation of error correction in a frame data structure.
Figure 10:
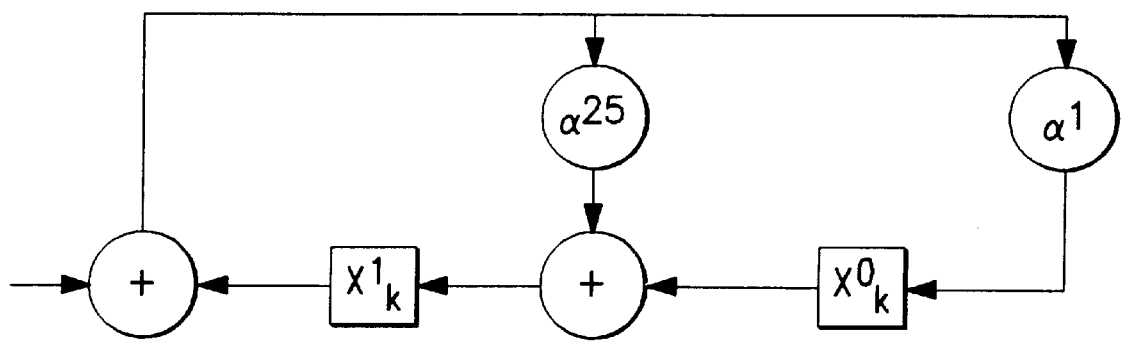
FIG. 10 is a schematic view of error correction logic utilized in the data storage system of FIG. 1.

The frame error correction characters (ECC) implemented by the present invention, and particularly utilized by ECC encoder and decoder 166, is illustrated in FIG. 9 and FIG. 10. FIG. 9 shows how byte position assignments are allocated within frame 300, the nomenclature $b_{j,k}$ being employed to depict byte position with the matrix of the frame, "j" being the row and "k" being the column.

In the illustrated embodiment, a (40,38,3) Reed-Solomon code is employed using a Galois Field Generator for $GF(2^8)$ defined as $G_\alpha(x)=x^8+x^4+x^3+x^2+1$. The ECC generator polynomial for the frame ECC bytes is given by:

$$G(x)=(x+\alpha^0)(x+\alpha^1)$$

$$G(x)=x^2+x(\alpha^0+\alpha^1)+\alpha^0\alpha^1=x^2+\alpha^{25}x+\alpha^1$$

where $\alpha$ is the primitive root of $GF(2^8)$, where $\alpha=0\times01$; $\alpha^1=0\times02$; and $\alpha^{25}=\alpha^0+\alpha^1=0\times03$. FIG. 10 is a block diagram of an implementation of G(x), the arrow from the left indicating introduction of data bytes b0,k . . . b37,k, where k is the column number which ranges from zero to 511. In FIG. 10, $x^0{}_k$ and $x^1{}_k$ are the frame ECC bytes for column k.

Figure 11:
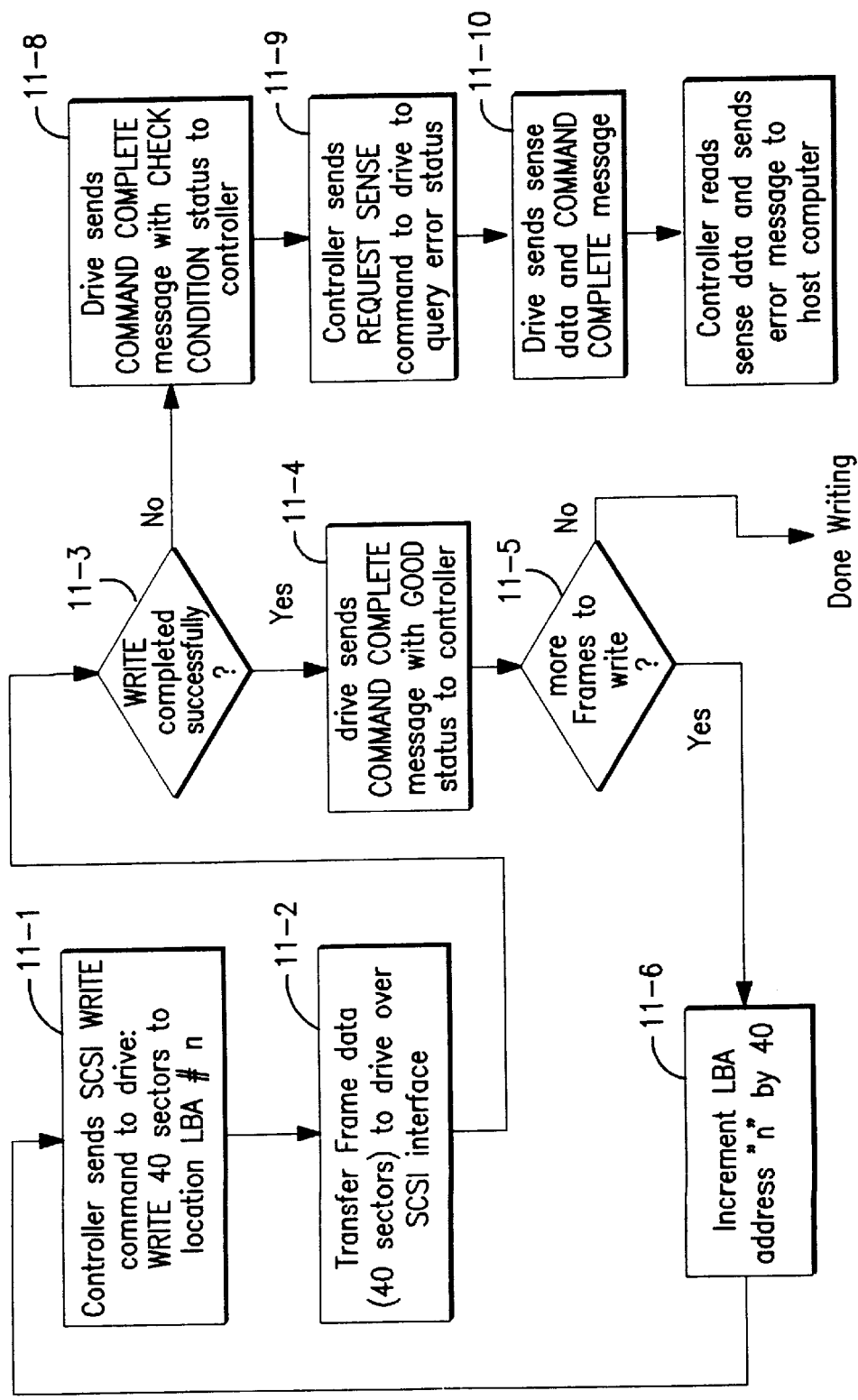
FIG. 11 is a flowchart generally showing exemplary steps involved in signaling between a tape drive emulator and a removable disk drive in a recording process for the data storage system of FIG. 1.
Figure 12A:
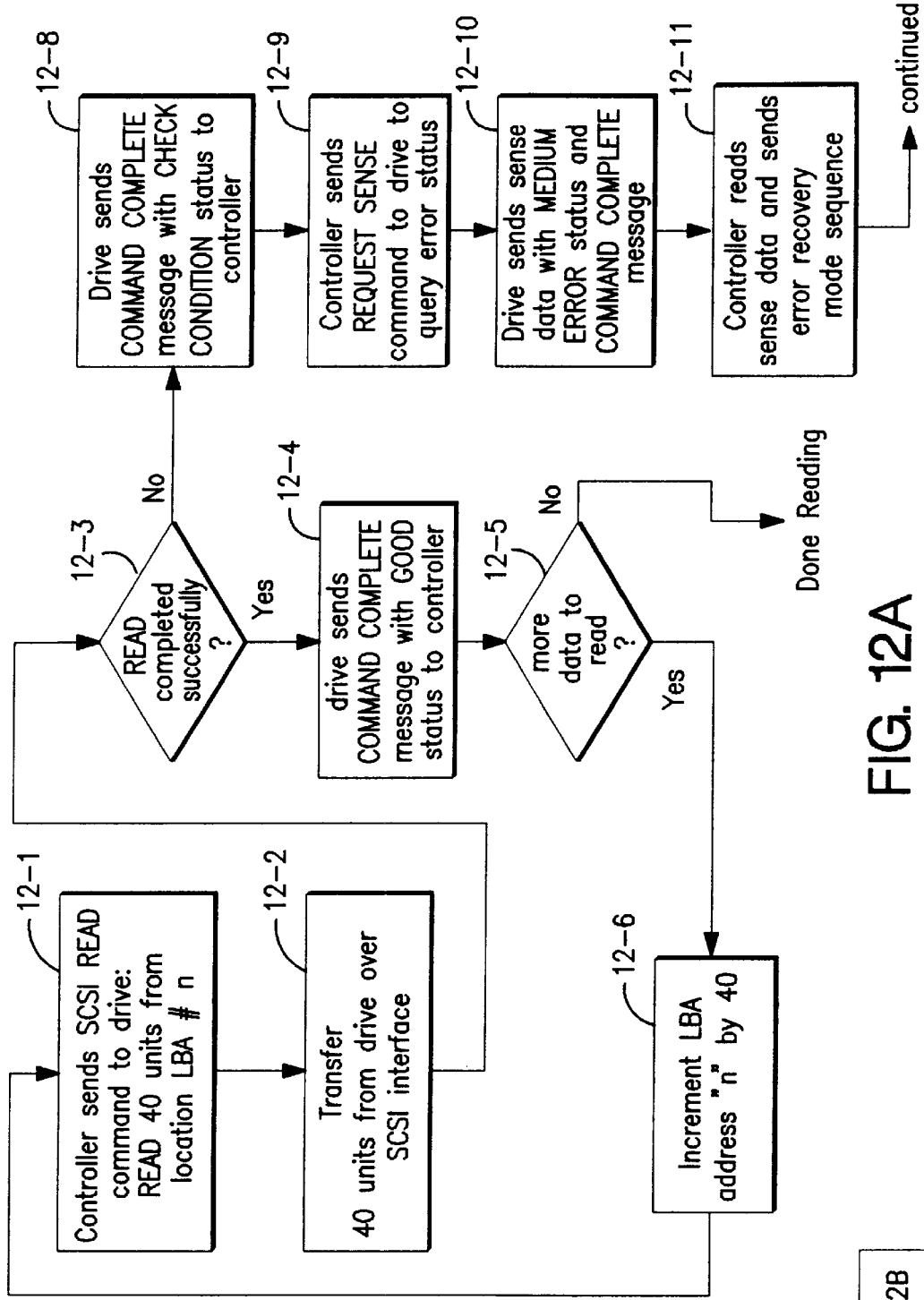
FIG. 12A and FIG. 12B are flowcharts generally exemplary showing steps involved in signaling between a tape drive emulator and a removable disk drive in a playback process for the data storage system of FIG. 1.
Figure 12B:
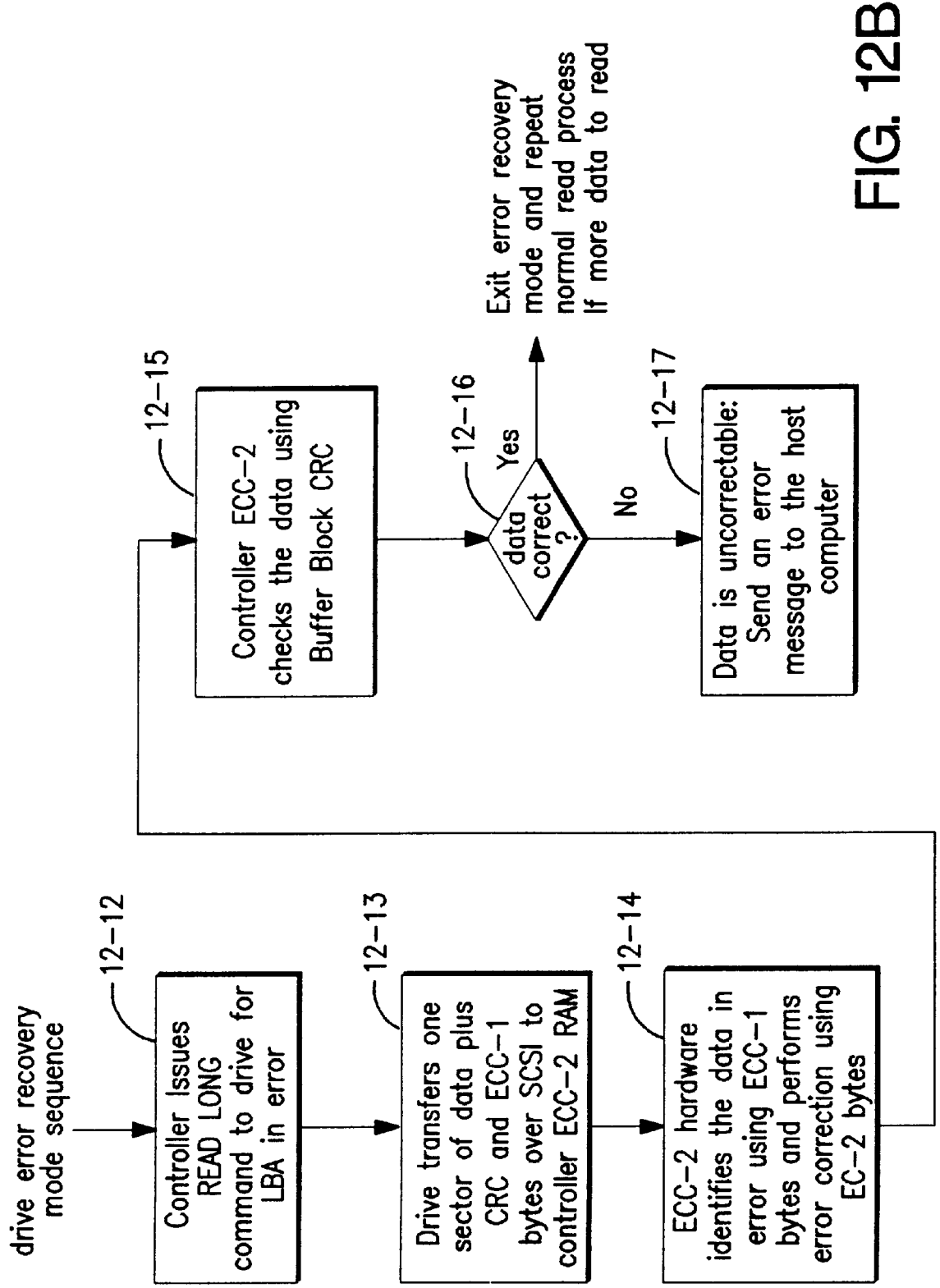

In connection with recording and playback operations, signaling occurs between tape drive emulator 30 and disk drive 22. FIG. 11 shows basic steps involved in write or recording signaling between tape drive emulator 30 and drive 22; FIG. 12A and FIG. 12B show basic steps involved in playback or read signaling between tape drive emulator 30 and drive 22.

In a recording or write process, host computer 40 directs tape drive emulator 30 to store data on the storage medium. In response, at step 11-1 tape drive emulator 30 sends a SCSI WRITE command to disk drive 22, specifying that forty sectors be written beginning in location block address (LBA) #n. Step 11-2 depicts the transfer of frame 300 (see FIG. 3), prepared in the manner described above e.g., with reference to FIG. 4, over cable 44 to disk drive 22. At step 11-3 disk drive 22 determines whether the recording on disk 24 was successfully completed. If the recording on disk 24 was successful, at step 11-4 disk drive 22 sends a COMMAND COMPLETE message to tape drive emulator 30. If host computer 40 then has more frames to be recorded (step 11-5), tape drive emulator 30 increments the LBA address "n" by forty sectors (step 11-6) and sends another SCSI WRITE command to disk drive 22 (11-1). The loop of steps 11-1 through 11-6 continues as long as host computer 40 has more frames to record.

In the event that a frame were not successfully recorded on disk 24 by disk drive 22, at step 11-8 disk drive 22 sends a COMMAND COMPLETE message with a check condition status to tape drive emulator 30. In response, at step 11-9 tape drive emulator 30 sends a REQUEST SENSE command to disk drive 22 to query the error status. Upon receipt of the query of error status, disk drive 22 sends a sense data and COMMAND COMPLETE message to tape drive emulator 30 as step 11-10. As shown by step 11-11, tape drive emulator 30 reads the sense data and sends an error message to host computer 40.

FIG. 12A and FIG. 12B show basic steps involved in playback or read signaling between tape drive emulator 30 and drive 22. When host computer 40 requires data from the storage medium (e.g., disk 24), a READ command is issued to tape drive emulator 30. In response, step 12-1 shows tape drive emulator 30 sending a SCSI READ command and to disk drive 22, specifically requesting that forty sectors (e.g., a frame) be read from a specified location (e.g., LBA #n). Upon receipt of the SCSI READ command, disk drive 22 transfers forty sectors worth of sector data area over cable 44 to tape drive emulator 30 (step 12-2). In addition, disk drive 22 determines whether its read operation was successfully completed (step 12-3). If the read operation was successfully completed, disk drive 22 sends a COMMAND COMPLETE message with a good status to tape drive emulator 30 (step 12-4). Then, if host computer 40 still requests more frames (determined at step 12-5), tape drive emulator 30 increments the logical block address (LBA #n) by forty sectors (step 12-6) and issues a further SCSI READ command (step 12-2) to disk drive 22. The reading of frames from disk 24 continues in this manner until it is determined at step 12-5 that host computer 40 has no further present requirement for data.

In the event that data was not successfully read by disk drive 22 from disk 24, at step 12-8 disk drive 22 sends a COMMAND COMPLETE message with a CHECK CONDITION status to tape drive emulator 30. Upon noting the CHECK CONDITION status, at step 12-9 tape drive emulator 30 sends a REQUEST SENSE command to disk drive 22 in order to query the error status. In response, at step 12-10 disk drive 22 sends sense data with medium error status and a COMMAND COMPLETE message to tape drive emulator 30. At step 12-11, tape drive emulator 30 reads the sense data and enters an error recovery mode sequence which is particularly depicted in FIG. 12B.

In the error recovery mode sequence of FIG. 12B, at step 12-12 tape drive emulator 30 issues a READ LONG command to disk drive 22 for the sector noted as containing an error. As depicted by step 12-13, the READ LONG command causes disk drive 22 to transfer to tape drive emulator 30 not only the 512 data bytes of the data area 204 (see FIG. 8), but also the sector ECC bytes generated by disk drive 22 and stored in sector data area 204.

At step 12-14, ECC encoder and decoder 166 of tape drive emulator 30 identifies the location of the error in the sector using the sector ECC bytes obtained from disk drive 22. Further, uses ECC encoder and decoder 166 then uses the frame ECC bytes obtained from the frame in order to perform error correction on the erroneous bytes. Thereafter, ECC encoder and decoder 166 checks the frame and its correction process by using the buffer block CRC bytes 312 (see FIG. 3) as shown in step 12-15. If the check at step 12-15 confirms that the data of the frame is correct (step 12-16), the error recovery mode sequence is terminated and execution continues with step 12-5 (to determine if other frames are required by host computer 40). Otherwise, at step 12-17 an error message is sent to host computer 40, indicating that the requested data is uncorrectable.

In addition to frames which contain user data, some of the frames are directory frames which contain index information. As shown in FIG. 14, a directory 1400 is a special block of frames on disk 24 which contains a frame index. The frame index is comprised of frame index entries, the format of one such frame index entry 1300 being shown in FIG. 13. The purpose of directory 1400 is to facilitate location by tape drive emulator 30 of the logical block addresses (LBAs) of specific data items (e.g., by logical block number or file number) stored in the frame structure on the data area of the disk.

There is one frame index entry 1300 generated for each frame 300 (see FIG. 3) recorded on disk 24. The frame index entries are packed into directory frames (by buffer block packer and unpacker unit 163) and recorded on the disk 24. In the case of a frame for a 512 byte sector (having 19,420 bytes of data area), 1294 frame index entries are stored in each directory frame. Directory 1400 is thus comprised of enough frames to store all frame index entries. Directory 1400 is recorded at a specific location on disk, e.g., starting at logical block address #0).

Figure 13:
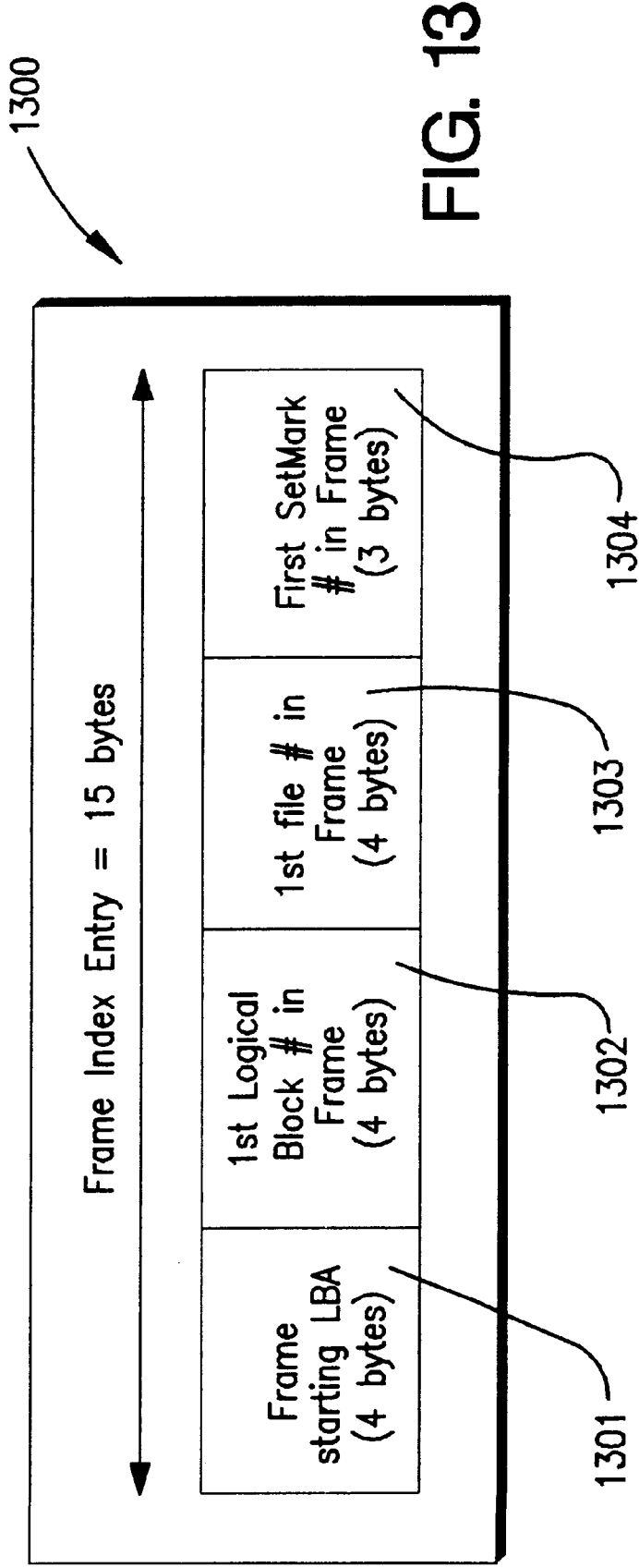
FIG. 13 is a diagrammatic view showing contents of a frame index entry in a directory recorded on a disk by the storage system of FIG. 1.
Figure 14:
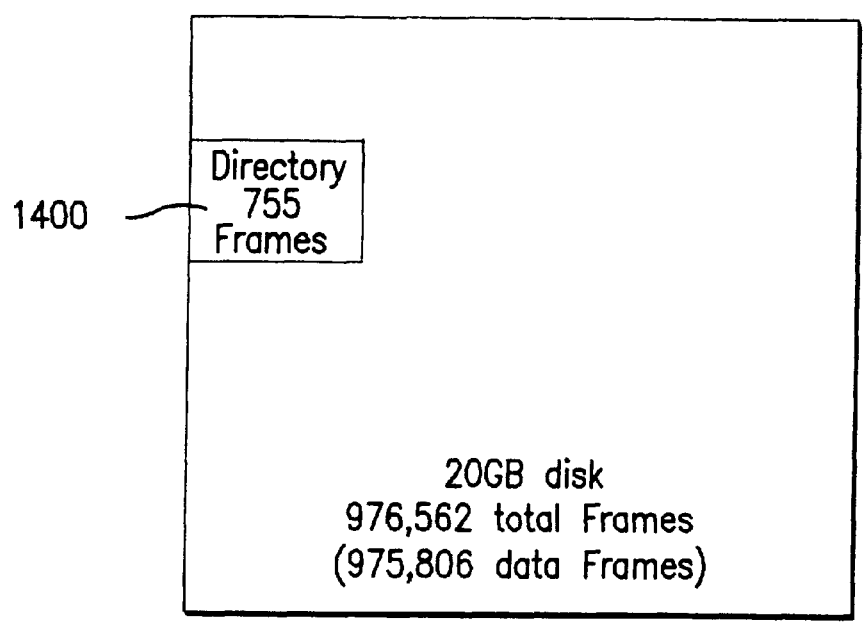
FIG. 14 is a diagrammatic view showing a relative location of a directory in context of a format of a disk handled by the storage system of FIG. 1.

FIG. 13 shows the format of frame index entry 1300. Each frame index entry 1300 has fifteen bytes. Frame index entry 1300 has a first field 1301 which contains four bytes of a frame starting LBA; a second field 1302 which contains the first logical block number in the frame (four bytes); a third frame field 1303 which contains the first file number in the frame (four bytes); and, a fourth frame field 1304 which contains the first setmark number in the frame (three bytes).

As one example, assume that a removable disk drive has a disk with a storage capacity of 20 GB. Such a disk has a capacity for 976,562 frames. The corresponding 976,562 frame index entries requires that directory 1400 have seven hundred fifty five frames.

Figure 15:
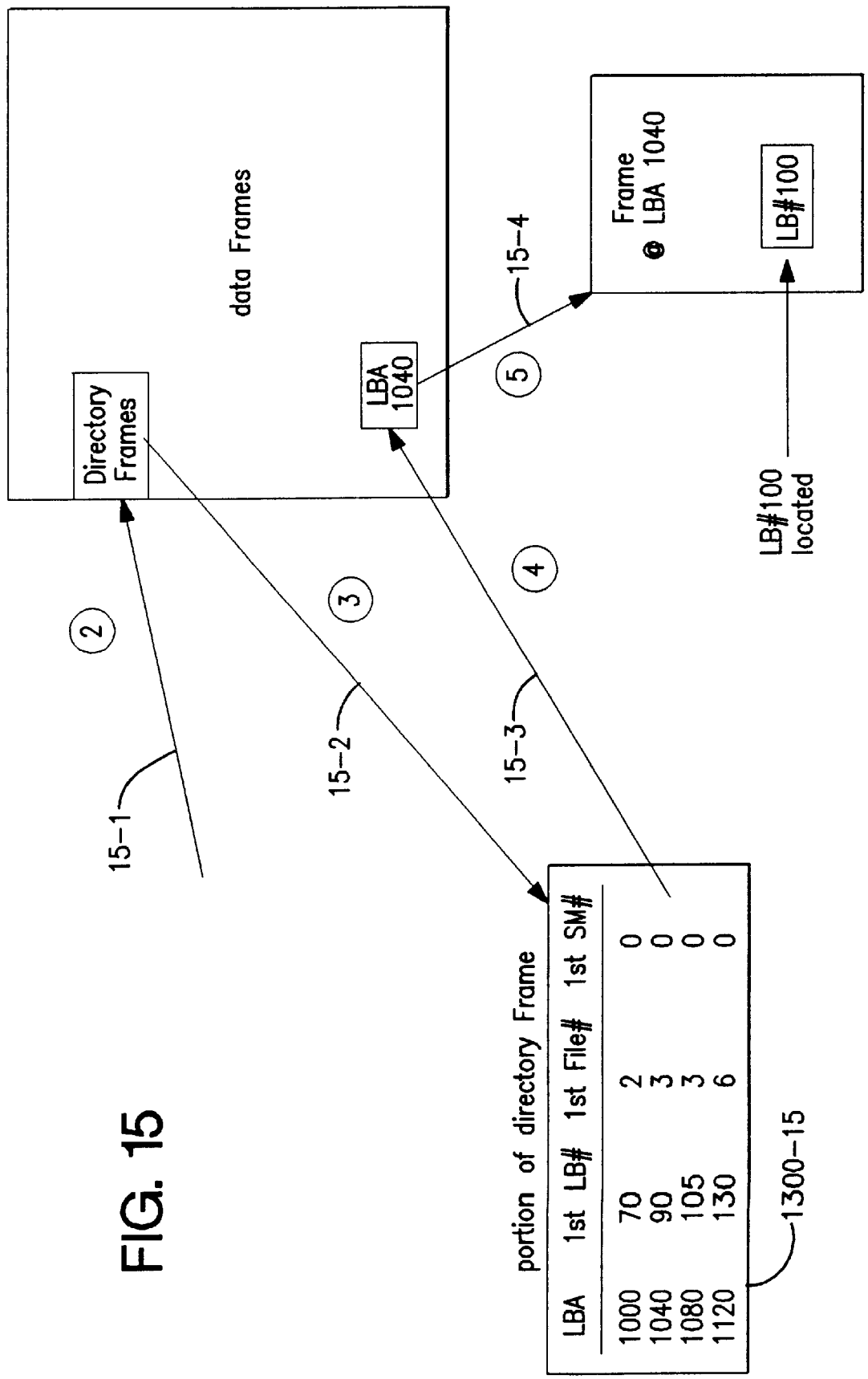
FIG. 15 is a diagrammatic view showing an example of usage of a directory recorded on a disk handled by the storage system of FIG. 1.

FIG. 15 provides an illustration of usage of directory 1400. It is assumed that host computer 40 issues a command to locate logical block #100 (LB #100). Upon receipt of such a command, tape drive emulator 30 sends a command to tape drive 22 (depicted by arrow 15-1) so that tape drive 22 reads directory 1400 of tape to identify the directory frame which contains a frame index entry for logical block LB #100. Upon receipt of the directory frame (depicted by arrow 15-2), a portion of which is shown as 1300-15 in FIG. 15, tape drive emulator 30 locates the frame index entry which indicates in which disk LBA the requested logical block (i.e., logical block LB #100) resides. As shown in FIG. 15, a frame recorded at disk LBA 1040 begins with logical block 90 and a frame recorded at disk LBA 1080 begins with logical block 105, meaning that the frame recorded at disk LBA 1040 has logical block #100 stored thereon. In FIG. 15, arrow 15-3 points to the frame recorded at disk LBA 1040 which has the sought logical block #100. Then, tape drive emulator 30 issues a command to disk drive 22 for disk drive 22 to read the frame which includes logical block #100, i.e., the frame beginning at LBA 1040, as indicated by arrow 15-4. In the process of reading the frame, logical block #100 is read and provided to host computer 40.

Thus, each frame index entry 1300 contains the first logical block number, the first file number, and the first set mark number stored in each frame. A specific item is located by searching for the highest entry below (or equal to ) the desired item. The associated logical block address (LBA) points to the frame where the beginning of the desired data item is located.

The present invention thus applies an additional logical format to allow a disk to be operated as a "virtual" tape backup device. In addition, the present invention adds additional ECC, herein known as frame ECC, to the embedded format of removable disk drive 22 to enhance its data reliability. The present invention increases data reliability of a removable disk drive by about ten orders of magnitude.

The tape drive emulator 30 of the present invention emulates the operation of a tape drive using a removable disk medium. The tape drive emulator 30 is advantageous since software written for data backup applications presently assumes that the data is recorded to a tape drive. Tape drives, being sequential in nature, use a different set of commands and functions to write, read, and locate data than do disk drives. One of those features, which is included in the present invention, but not present in disk drives, is data delineators or delimiters such as file marks and set marks, as well as the ability to search for data based on delineator or delimiter types (logical blocks, file number, setmark number, etc.). The directory 1400 of the present invention particularly facilitates such searching and location.

It should be understood that numerous variations of the foregoing are still within the spirit of the invention. For example, tape drive emulator 30 can be provided separately (e.g., apart from disk drive 22).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data storage system which connects to a host computer for performing one of a data backup operation and data restore operation, the data storage system comprising:
   a disk drive which transduces information in a sector format with respect to a rotating disk,
   a tape drive emulator connected between the disk drive and the host computer, the tape drive emulator interfacing with the host computer using a set of commands applicable to a tape drive, the tape drive emulator communicating data to and from the disk drive whereby the data is transduced relative to the disk in the sector format,
   wherein the tape drive emulator generates a frame of data, the frame of data being recorded in a predetermined plural number of sectors on the disk, the frame of data having frame error correction bytes generated over the frame, the error correction bytes being sufficient to recover a sector of the disk not readable by the disk drive.

2. The system of claim 1, wherein the tape drive emulator generates plural frames of data, each of the frames of data being recording on the predetermined plural number of sectors on the disk, at least some of the frames serving as directory frames, the directory frames having stored therein references to storage locations on the disk of data delineators.

3. The system of claim 2, wherein the data delineators include one of logical block numbers, file marks, and set marks.

4. A data storage system which connects to a host computer for performing one of a data backup operation and data restore operation, the data storage system comprising:
   a disk drive which transduces information on a rotating disk,
   a tape drive emulator connected between the disk drive and the host computer, the tape drive emulator comprising:
      a compression engine which compresses logical blocks obtained from the host computer;
      a packer unit which packs compressed logical blocks into a buffer block;
      an error correction encoder which generates error correction bytes over the buffer block; and
   wherein the buffer block and error correction bytes are combined for transmission as a frame to the disk drive, the frame being recordable in a predetermined plural number of sectors on the disk drive.

5. The system of claim 4, wherein the error correction bytes are sufficient to recover a sector of the disk not readable by the disk drive.

6. The system of claim 4, wherein the tape drive emulator further comprises a header generator which generates header bytes for inclusion in the frame, the header bytes including frame identifying information.

7. A method of storing computer data on a rotating magnetic disk, the method comprising:
   obtaining logical blocks of data from a host computer;
   assembling the logical blocks into a buffer block, the buffer block having a size equivalent to a first predetermined number of sectors of the disk;
   generating error correction bytes for the buffer block and adding the error correction bytes to the buffer block to form a frame, the frame having a size equivalent to a second predetermined number of sectors of the disk; and
   recording the frame on the disk.

8. The method of claim 7, further comprising generating a frame header and including the frame header in the buffer block, the error correction bytes being generated over the buffer block including the frame header.

9. The method of claim 7, further comprising generating a CRC bytes for the buffer block and including the CRC bytes in the buffer block, the error correction bytes being generated over the buffer block including the CRC bytes.

10. The method of claim 7, further comprising compressing the logical blocks prior to assembling the logical blocks into the buffer block.

11. A tape drive emulator connected between a removable disk drive and a host computer, the tape drive emulator comprising:
    a compression engine which compresses logical blocks obtained from the host computer;
    a packer unit which packs compressed logical blocks into a buffer block;
    an error correction encoder which generates error correction bytes over the buffer block; and
    wherein the buffer block and error correction bytes are combined for transmission as a frame to the disk drive, the frame being recordable in a predetermined plural number of sectors on the disk drive.

12. The apparatus of claim 11, wherein the error correction bytes are sufficient to recover a sector of the disk not readable by the disk drive.

13. The apparatus of claim 11, wherein the tape drive emulator further comprises a header generator which generates header bytes for inclusion in the frame, the header bytes including frame identifying information.

14. The apparatus of claim 11, wherein the frame serves as a directory frame, the directory frame having stored therein references to storage locations on the disk of data delineators.

15. The apparatus of claim 14, wherein; the data delineators include one of logical block numbers, file marks, and set marks.

16. The system of claim 1, wherein the predetermined plural number of sectors is forty.

17. The system of claim 1, wherein error correction information is stored on two of the predetermined plural number of sectors.

18. The system of claim 1, wherein user data included in a frame corresponds to a buffer block of data generated by the tape drive.

19. The system of claim 4, wherein the predetermined plural number of sectors is forty.

20. The system of claim 4, wherein error correction information is stored on two of the predetermined plural number of sectors.

21. The system of claim 4, wherein user data included in a frame corresponds to a buffer block of data generated by a the tape drive.

22. The system of claim 11, wherein the predetermined plural number of sectors is forty.

23. The system of claim 11, wherein error correction information is stored on two of the predetermined plural number of sectors.

24. The system of claim 11, wherein user data included in a frame corresponds to a buffer block of data generated by a the tape drive.

25. A rotating information storage media formatted with sectors, a frame of data being recorded over a predetermined plural number of the sectors, the frame including user data and error correction information which permits recovery of the frame when a bad one of the sectors of the plural number of sectors is unreadable.

26. The media of claim 25, wherein the predetermined plural number of sectors is forty.

27. The media of claim 25, wherein the error correction information is stored on two of the predetermined plural number of sectors.

28. The media of claim 25, wherein the user data included in the frame corresponds to a buffer block of data generated by a the tape drive.

29. The media of claim 25, wherein some of the frames are directory frames.

30. A tape drive emulator which interfaces with a host computer using a set of commands applicable to a tape drive, the tape drive emulator generating a frame of data for recordation in a predetermined plural number of sectors on a rotating information storage media, the frame having frame error correction bytes generated over the frame, the error correction bytes being sufficient to recover a sector of the disk not readable by the disk drive.

31. The tape drive emulator of claim 30, wherein the tape drive emulator generates plural frames of data, each of the frames of data being recording on the predetermined plural number of sectors on the disk, at least some of the frames serving as directory frames, the directory frames having stored therein references to storage locations on the disk of data delineators.

32. The tape drive emulator of claim 31, wherein the data delineators include one of logical block numbers, file marks, and set marks.

33. The system of claim 1, wherein the disk is a rotating magnetic disk.

34. The system of claim 1, wherein the disk is a removable disk.

35. The system of claim 4, wherein the disk is a rotating magnetic disk.

36. The system of claim 4, wherein the disk is a removable disk.

* * * * *